United States Patent Office 3,352,684
Patented Nov. 14, 1967

3,352,684
METHOD OF INCREASING PRODUCTION OF SALABLE EGGS
Don I. Gard and Joseph E. Wachtstetter, Greenfield, Ind., assignors to Eli Lilly and Company, Indianapolis, Ind., a corporation of Indiana
No Drawing. Filed Aug. 3, 1964, Ser. No. 387,199
7 Claims. (Cl. 99—4)

This invention relates to a novel method of increasing the percent of salable eggs for food consumption and hatching purposes produced by a hen during her useful lifetime.

It is well known that administration of high levels of progestational agents to laying hens causes a cessation of egg production and also induces molting. For example, Smith et al., Poul. Sci., 36, 346 (1957), found that single injections of 10 and 25 mg. of progesterone into yearling hens induced molding. Similarly, Winget and Griffin, Poul. Sci. 41, 564 (1962), found that injection of the progestational agent, norethandrolone, at the rate of 1 mg./kg. for five days into sexually mature hens caused 100% cessation of egg production. By contrast, U.S. Patent 2,945,765, issued July 19, 1960, states that feeding low levels of progesterone brings pullets into egg production very rapidly. Nalbandov, Poul. Sci. 35, 1162 (1956), found that injection of a low level of progesterone into pullets also accelerated the onset of lay, but that under these conditions the average egg weight was lower for the treated pullets than for the control pullets.

The last mentioned finding highlights one of the chief problems concerned with the sexual maturing of the pullet and the accompanying onset of egg production. This problem is the production of pullet eggs during the first month of egg production. A pullet egg is one which is too small to command a respectable price in the market, but which costs as much to collect, clean and pack as do the medium and large eggs which command a better price.

It is an object of this invention to provide a method for increasing the percent of salable eggs for food consumption and hatching purposes produced by hens during their useful lifetimes without decreasing the total mass of eggs produced by said hens. Other objects of this invention will become apparent from the following description.

In fulfillment of the above and other objects, this invention provides a method for increasing the number of salable eggs produced by hens during their lifetime which comprises administering a progestational agent to said hens, said administration being initiated during the period beginning just prior to the onset of sexual maturity of the hens up to the time when the flock is in 10% egg production, in an amount sufficient to delay the onset of egg laying up to 42 days. The progestational agent can be administered either by the oral route in the feed, by intramuscular or subcutaneous injection or by pellet implantation. The quantity of progestational agent employed will depend upon the route of administration and on the degree of activity of the agent by the particular route chosen.

The process of this invention is carried out as follows: the administration of a progestational agent to a flock of pullets is begun somewhere between the 126 and 150 day of the life of the pullets depending upon the strain of pullets, the rate of attaining sexual maturity in the average bird of that strain, as well as on light and feed conditions during their growth. In a particular strain of pullets, for example, the H & N (Heisdorf and Nelson) strain, 2% production is achieved around the 20th week of life and 10% around the 21st week under normal light conditions and a standard feeding program. The 126th day of life would thus be prior to the initiation of egg production in most strains under normal light and feeding conditions.

Using chlormadinone acetate (6-chloro-17-acetoxy-$\Delta^6$-progesterone) as the progestational agent for illustrative purposes only, the compound is administered at the rate of 0.5–2 mg. per bird per day orally or at the rate of 5–25 mg. per bird by parenteral injection. The injection can be by the subcutaneous or intramuscular route and a single injection or multiple injections at stated intervals can be employed. The total amount of chlormadinone acetate administered, using multiple injections, however, remains within the 5–25 mg. range. Pullets to whom about 5 mg. of the chlormadinone acetate is administered by single injection are kept out of production for about seven days after the injection. With a 25 mg. injection of chlormadinone acetate, pullets are kept out of production for about thirty days. If tandem or multiple injections are used, the birds are kept out of production for a somewhat longer time than if the total dosage had been administered in a single injection. Chlormadinone acetate is usually administered to the pullets by the oral route by incorporating the particular compound in the feed at a level of preferably from 4–50 g. per ton of feed. Pullets to whom the chlormadinone acetate is administered by this route are kept out of production for from 5–21 days after the compound is no longer present in the diet, the length of time depending upon the daily dose level and relative stage of pullet maturity. The hens who receive chlormadinone acetate in the diet are usually maintained on treatments for an average period of about twenty-one days although treatment running from 7–28 days give comparable results. In general, the higher the level of chlormadinone acetate in the feed, the shorter the period of time of administration that is necessary to achieve a desirable delay in onset of egg production in the flock. However, better results are obtained, in terms of degree of delay in onset of pullet maturity, by employing longer feeding periods at lower dosage rates than by just increasing dosage rate. As will be apparent to those skilled in the art, the level of progestational agent in the feed and the duration of feeding necessary to achieve maximal results depends on the degree of maturity of the pullet at the time when treatment is initiated. For example, longer periods of feeding chlormadinone acetate are needed to achieve a desirable delay in onset of maturity in younger pullets than in older ones.

Although chlormadinone acetate was employed to illustrate the dosage level of a progestational agent in our novel process, it is apparent that other progestational agents could be employed in its stead, for example, chlormadinone, norethindrone, norethandrolone, progesterone, and the like. Dosages of these or other progestational agents which are equivalent to the above range of doses set forth for chlormadinone acetate depend upon both the nature of the compound and the route of administration. For example, norethandrolone is five times more active than progesterone subcutaneously but fifty times more active orally. Chlormadinone acetate is fifty times more active than norethandrolone and five hundred times more active than norethindrone by injection and fifty times more active than either orally. Thus, a daily oral intake of chlormadinone acetate of from 0.5–2 mg. per bird would be equivalent to 25–100 mg. per bird per day of norethindrone. Similar equivalencies of other progestational agents to chlormadinone acetate can be determined experimentally, and their dosage levels in our novel process can in turn be determined from these data.

The process of this invention results in an increase in the percentage of large and medium eggs laid by a hen or by a flock of hens without any decrease in the mass of eggs produced by a hen or flock of hens during their useful productive lives or any decrease in the quality or hatchability of the eggs. Table I which follows gives the results of a typical experiment wherein chlormadinone acetate was administered in the feed for twenty-one days to groups of forty H & N pullets at varying times after hatching, and a greater percent of salable eggs was found in the treated groups than in a control group. In the table, column 1 gives the number of grams of chlormadinone per ton of feed, column 2 the date treatment was initiated, column 3 the day treatment was ended, column 4 the average days delay of lay of median hen as compared to corresponding hen for control group, column 5 the average egg mass produced in kg. per hen, and column 6 the percent of large and medium eggs. The eggs upon which the data in columns 5 and 6 are based were collected for about sixty-six weeks after the start of egg production in the control group. The eight grams per ton level of chlormadinone acetate in the feed means that on the average, each pullet received about .7 mg. of the progestational agent per day. At the 16 g. per ton level in the feed, the daily intake of the progestational agent was about 1.4 mg. per pullet.

TABLE I

| Grams/ton | Treatment | | Average Days Delay | Average Egg Mass | Percent Large and Medium |
|---|---|---|---|---|---|
| | Date Initiated | Date Ended | | | |
| Control | | | | 17.906 | 92.4 |
| 8 | 126 | 147 | 4.8 | 18.175 | 94.8 |
| 8 | ¹ 140 | 161 | 16.6 | 18.275 | 96.5 |
| 8 | ² 147 | 168 | 21.5 | 17.332 | 94.5 |
| 12 | 147 | 168 | 20.9 | 17.726 | 95.6 |
| 16 | 147 | 168 | 22.8 | 17.925 | 96.1 |

¹ 2% production.  ² 10% production.

Table II below gives similar data for subcutaneous administration of chlormadinone acetate to groups of forty pullets with eighty pullets in the control group as before. In the table, column 1 gives the treatment level, column 2 the day of injection, column 3 the average days delay of lay of median hen as compared to corresponding hen for control group, column 4 the average egg mass in kg. per hen, and column 5 the percent of large and medium eggs. The eggs upon which the data in columns 4 and 5 are based were collected for about sixty-six weeks after the start of egg production in the control group.

TABLE II

| Treatment Level | Day of Injection | Average Days Delay | Average Egg Mass | Percent Large and Medium |
|---|---|---|---|---|
| Control | | | 17.906 | 92.4 |
| 5 mg | ¹ 140 | 9.1 | 17.595 | 94.1 |
| 5 mg | ² 147 | 12.1 | 17.968 | 94.2 |
| 10 mg | 126 | 8.5 | 17.919 | 94.8 |
| 10 mg | 140 | 13.5 | 18.802 | 93.9 |
| 10 mg | 147 | 16.8 | 17.594 | 96.0 |
| 25 mg | 126 | 24.2 | 17.749 | 97.0 |
| 25 mg | 140 | 26.3 | 17.698 | 96.5 |
| 25 mg | 147 | 30.0 | 17.177 | 96.4 |

¹ 2% production.  ² 10% production.

The control group in the above experiment began to lay eggs at 131 days of age.

In the above tables any increase in percent of large and medium eggs greater than 3% over the control is highly significant statistically.

Intramuscular rather than subcutaneous injection of chlormadinone acetate gives entirely comparable results to those set forth in Table II above.

As can be seen from the above tables, the percent of large and medium eggs produced by hens in which the onset of egg laying was delayed by the administration of a progestational agent is invariably greater than those produced by a control group of hens, under similar light conditions and fed a similar diet and, in many of the groups of hens at different dosages, this difference was highly significant statistically. It is also apparent from the above table that the average egg mass produced by the treated hens did not differ appreciably from that produced by hens in a control group, some of the egg masses for the treated hens being higher and some being lower than those of the control group. Our novel process is also equally effective under either decreasing and increasing light conditions. Furthermore, the progestational agent can be given to a mixed flock, i.e., one containing both males and females, without any harm to the males.

It is also an advantage of our novel process that the production of more medium and large eggs from treated hens results in a greater percent of settable eggs and consequently a larger number of salable chicks. The quality of the eggs produced by the treated hens was in no way inferior to that in the control hens. The shell thickness in the two groups was strictly comparable and there was no increase in blood spots with eggs from the treated hens. In some instances it was found that there was an actual improvement in the USDA score for eggs from treated hens. The hatchability and fertility of the eggs from the treated hens was also in no way decreased by the delay of the onset of the maturity in these hens by treatment with a progestational agent.

The following description relates in somewhat greater detail the process of this invention.

*Example*

Four hundred and forty pullets of 126 days of age were divided into nine treatment groups of forty pullets each with eighty pullets placed in a control group. 5, 10, and 25 mg. of chlormadinone acetate were injected subcutaneously into each bird of a treatment group at 126, 140, and 147 days respectively, thus giving nine different treatments. Injections were given in a single ml. of diluent and the remaining group, the control group, was injected with 1 ml. of the diluent alone. The hens were fed an egg and breeder ration containing 64% ground yellow corn meal, 18% soybean oil meal, 2.5% distillers dried solubles, 2.5% dehydrated alfalfa meal, 2% fish meal, 1.6% animal fat, 2.2% dicalcium phosphate, 6.2% calcium carbonate, .4% salt, .05% trace minerals, including manganese, zinc, iron, copper, iodine and cobalt, and 0.55% of a supplemental vitamin mixture. The treated pullets began to lay about the fourteenth day after injection. All eggs for each group were collected, weighed and graded separately. The eggs were collected for sixty-six weeks after egg production had begun in the control group. The results of this experiment are listed in Table II above. One of the groups of hens receiving 5 mg. of chlormadinone acetate on the 126 day of life was discontinued because the length of delay in onset of egg production was of short duration; the control group of pullets did not come into production as soon as expected; and as a consequence, it was not possible to obtain any meaningful egg production data from this group.

A similar experiment was carried out in which chlormadinone acetate was added to an egg and breeder ration of the type outlined above at the rate of 8, 12, and 16 grams per ton for a period of twenty-one days. The chlormadinone acetate was added to the ration for different groups of pullets starting at 126, 140, and 147 days of age. All eggs were collected from each group for a period of sixty-six weeks after the control group began to lay. The data from this experiment are outlined in Table I above.

A similar experiment was carried out in which chlormadinone acetate was injected into different groups of pullets at 141 days at the rate of 5 and 10 mg. per pullet. This injection was repeated 10 days later, giving total doses per bird of 10 and 20 mg. respectively. The results obtained in this experiment were entirely similar to those seen in Table II above.

We claim:

1. A process for increasing the number of salable eggs for food consumption and hatching purposes laid by hens during their productive lifetime which comprises administering a progestational agent to sexually immature hens in an amount sufficient to delay the onset of sexual maturity in said hens up to forty-two days, said amount being the equivalent of from 0.5 to 2.0 mg. of chlormadinone acetate per bird per day, the administration of said progestational agent to said hens being initiated during the period beginning just prior to the onset of sexual maturity of said hens to the time when the flock of said hens is in 10% egg production.

2. The process according to claim 1 wherein the progestational agent is chlormadinone acetate.

3. A method for increasing the number of salable eggs for food production and hatching purposes laid by hens during their productive lifetime which comprises administering to sexually immature hens by the oral route a progestational agent for a period of from seven to twenty-eight days, said administration of said progestational agent being initiated during the period beginning just prior to the onset of sexual maturity of said hens up to the time when the flock of said hens is in 10% egg production, said progestational agent being administered at the rate of an amount equivalent to from 0.5–2.0 mg. of chlormadinone acetate per bird per day.

4. The process of claim 3 wherein the progestational agent is administered as a component in a complete feed ration.

5. The process according to claim 4 wherein the progestational agent is chlormadinone acetate.

6. A method for increasing the number of salable eggs for food consumption and hatching purposes laid by hens during their productive lifetime which comprises administering a progestational agent to sexually immature hens by the parenteral route, said administration being initiated during the period beginning just prior to the onset of sexual maturity in said hens up to the time when the flock of said hens is in 10% egg production, the total amount of said progestational agent administered being equivalent to from 5–25 mg. of chlormadinone acetate per bird.

7. The process according to claim 6 wherein the progestational agent is chlormadinone acetate.

References Cited

UNITED STATES PATENTS 2,945,765    7/1960    Snyder et al.
3,212,969    10/1965    Bowers.

OTHER REFERENCES

Poultry Science, vol. 35, pp. 323–6, 1956.
J. Amer. Chem. Soc., vol. 81 pp. 3485–6 June-August (1959).

A. LOUIS MONACELL, *Primary Examiner.*

RAYMOND N. JONES, *Examiner.*

D. DONOVAN, H. H. KLARE, *Assistant Examiners.*